United States Patent
Chitta et al.

(10) Patent No.: US 11,235,458 B2
(45) Date of Patent: Feb. 1, 2022

(54) MANIPULATING BOXES USING A ZONED GRIPPER

(71) Applicant: Kinema Systems Inc., Waltham, MA (US)

(72) Inventors: Sachin Chitta, Palo Alto, CA (US); David Hershberger, Menlo Park, CA (US); Karl Pauwels, Redwood City, CA (US)

(73) Assignee: Boston Dynamics, Inc., Waltham, MA (US)

( * ) Notice: Subject to any disclaimer, the term of this patent is extended or adjusted under 35 U.S.C. 154(b) by 352 days.

(21) Appl. No.: 16/538,114

(22) Filed: Aug. 12, 2019

(65) Prior Publication Data

US 2020/0047331 A1 Feb. 13, 2020

Related U.S. Application Data

(60) Provisional application No. 62/718,060, filed on Aug. 13, 2018.

(51) Int. Cl.
 *B25J 13/08* (2006.01)
 *B25J 9/10* (2006.01)
 (Continued)

(52) U.S. Cl.
 CPC ............... *B25J 9/10* (2013.01); *B25J 9/1612* (2013.01); *B25J 13/08* (2013.01); *B25J 15/0683* (2013.01); *B66F 9/02* (2013.01)

(58) Field of Classification Search
 CPC ... B25J 9/10; B25J 9/1612; B25J 13/08; B25J 15/0683; B25J 9/00; B25J 9/0093;
 (Continued)

(56) References Cited

U.S. PATENT DOCUMENTS 9,102,055 B1 * 8/2015 Konolige ............. G06K 9/3208
9,205,558 B1 * 12/2015 Zevenbergen ......... B25J 9/1633
(Continued)

OTHER PUBLICATIONS

A 3D perception-based robotic manipulation system for automated truck unloading (Year: 2016).*
(Continued)

*Primary Examiner* — McDieunel Marc
(74) *Attorney, Agent, or Firm* — Honigman LLP; Brett A. Krueger

(57) ABSTRACT

A method of manipulating boxes includes receiving a minimum box size for a plurality of boxes varying in size located in a walled container. The method also includes dividing a grip area of a gripper into a plurality of zones. The method further includes locating a set of candidate boxes based on an image from a visual sensor. For each zone, the method additionally includes, determining an overlap of a respective zone with one or more neighboring boxes to the set of candidate boxes. The method also includes determining a grasp pose for a target candidate box that avoids one or more walls of the walled container. The method further includes executing the grasp pose to lift the target candidate box by the gripper where the gripper activates each zone of the plurality of zones that does not overlap a respective neighboring box to the target candidate box.

20 Claims, 13 Drawing Sheets

(51) Int. Cl.
*B25J 9/16* (2006.01)
*B25J 15/06* (2006.01)
*B66F 9/02* (2006.01)

(58) Field of Classification Search
CPC ......... B25J 9/04; B25J 9/16; B25J 9/18; B25J 9/1664; B25J 9/1687; B25J 9/1669; B25J 9/1694; B25J 9/1633; B66F 9/02; B65G 1/34; B65G 67/24; G05B 19/18; G05B 19/418
See application file for complete search history.

(56) References Cited

U.S. PATENT DOCUMENTS

| | | | | |
|---|---|---|---|---|
| 9,486,921 | B1* | 11/2016 | Straszheim | B25J 9/1679 |
| 10,025,886 | B1* | 7/2018 | Rublee | G01B 11/254 |
| 10,625,432 | B2* | 4/2020 | Wagner | B25J 9/1687 |
| 10,780,581 | B1* | 9/2020 | Prats | B25J 9/1664 |
| 2015/0290805 | A1 | 10/2015 | Morency et al. | |
| 2016/0016311 | A1* | 1/2016 | Konolige | B25J 9/1612 700/245 |
| 2016/0207195 | A1 | 7/2016 | Eto et al. | |
| 2017/0225330 | A1* | 8/2017 | Wagner | B25J 15/0616 |
| 2017/0305694 | A1* | 10/2017 | McMurrough | B25J 15/0616 |
| 2018/0273296 | A1* | 9/2018 | Wagner | B65G 1/1378 |
| 2018/0282065 | A1* | 10/2018 | Wagner | G06Q 10/087 |
| 2019/0270197 | A1* | 9/2019 | Wagner | B25J 9/1669 |
| 2020/0238519 | A1* | 7/2020 | Diankov | G06T 7/73 |

OTHER PUBLICATIONS

No More Heavy Lifting: Robotic Solutions to the Container Unloading Problem (Year: 2016).*
Fast Edge-Based Detection and Localization of Transport Boxes and Pallets in RGB-D Images for Mobile Robot Bin Picking (Year: 2016).*
Initial experiments on learning-based randomized bin-picking allowing finger contact with neighboring objects (Year: 2016).*
International Search Report, PCT/US2019/046174, dated Jan. 3, 2020, 13 pages.

* cited by examiner

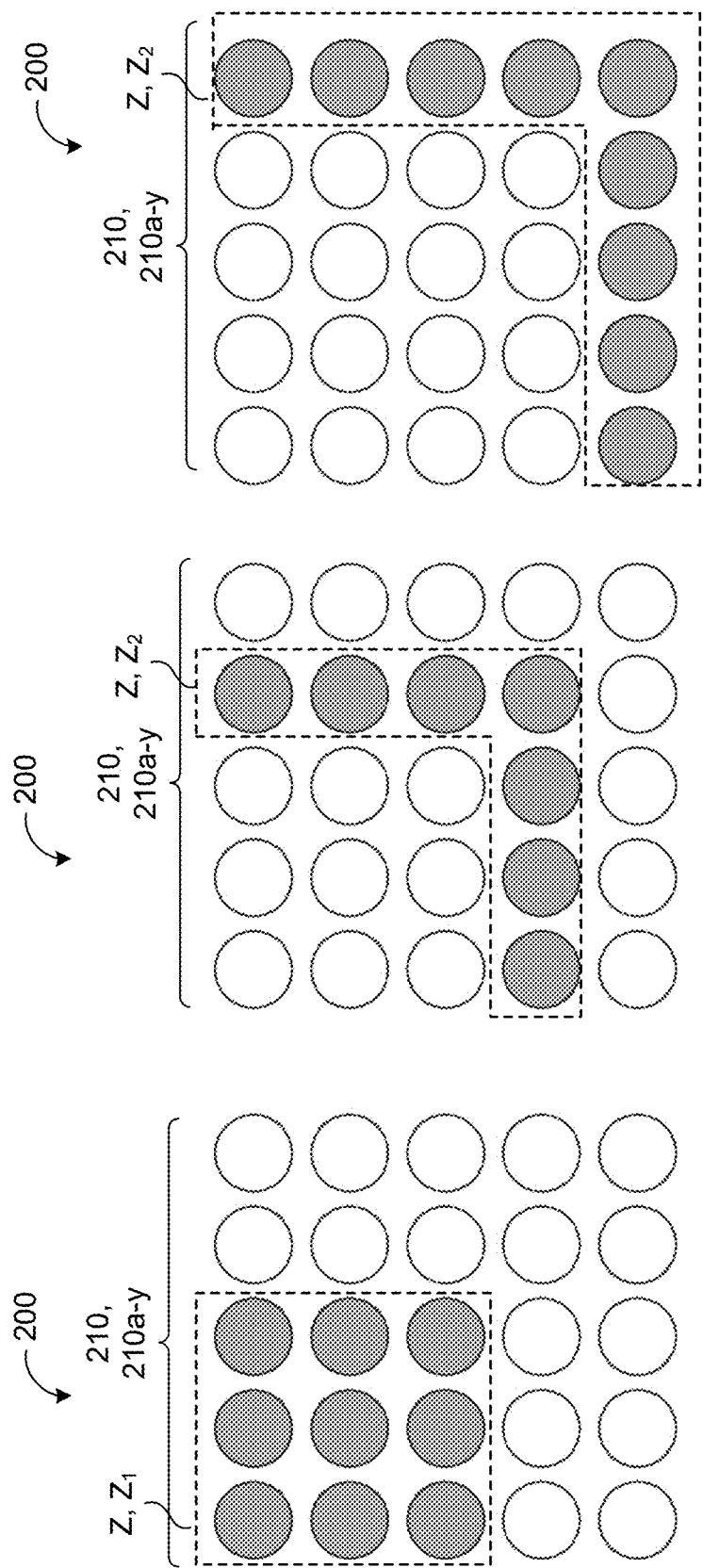

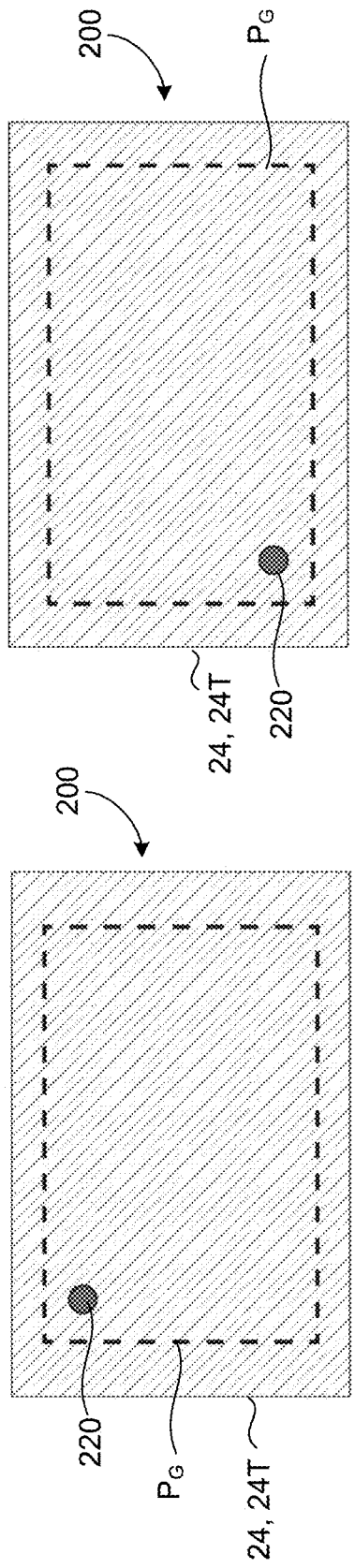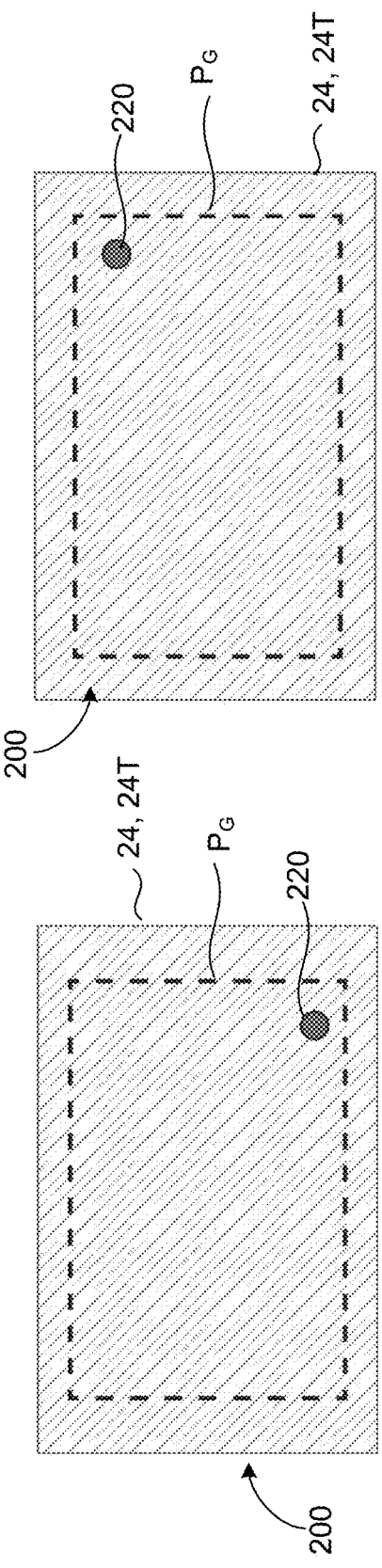

MANIPULATING BOXES USING A ZONED GRIPPER

CROSS REFERENCE TO RELATED APPLICATIONS

This U.S. patent application claims priority under 35 U.S.C. § 119(e) to U.S. Provisional Application 62/718,060, filed on Aug. 13, 2018. The disclosure of this prior application is considered part of the disclosure of this application and is hereby incorporated by reference in its entirety.

TECHNICAL FIELD

The present disclosure is directed toward manipulating boxes using a zoned gripper.

BACKGROUND

Box-like objects represent a large percentage of objects that need to be picked (i.e., removed from a pallet or holding container) in industrial, manufacturing, logistics, and commercial environments. Typically, box-like objects are characterized by at least one substantially planar picking surface. Conventionally, during robotic picking, a picking robot handles known sizes, numbers, and types of boxes arranged in a uniform manner on a structured pallet. Using mechanical fixtures, some current systems pre-position a pallet of boxes so that a robot can pick them from known pre-programmed locations. Any deviation from this known structure, either in the size of the box, the number of boxes, or the location of boxes results in failure of the system. Unfortunately, computer-vision-based systems often rely on the boxes having clean edges at their boundaries and cannot accurately determine size and/or position of boxes that have advertising, printed characters, printed logos, pictures, color, or any other texture on them. Such boxes have visual edges on their faces (i.e., edges that do not correspond to an actual physical boundary of the box). Because current computer-vision-based systems cannot distinguish the physical edges between two different boxes from other visual edges on the faces of boxes, these systems tend to misjudge the size and position of the box(es). Problematically, picking and moving the box where the system has misjudged its size and location may either cause the box to slip from the grasp of the robot or may cause the robot to pick two or more boxes where it should have picked only one.

SUMMARY

One aspect of the disclosure provides a method of manipulating boxes using a zoned griper. The method includes receiving, at a control system, a minimum box size for a plurality of boxes varying in size. Here, the plurality of boxes are located in a walled container. The robot includes a gripper with a plurality of vacuum suction cups. The method also includes dividing, by the control system, a grip area of the gripper into a plurality of zones based on the minimum box size. The method further includes locating, by the control system, a set of candidate boxes of the plurality of boxes based on an image from a visual sensor. For each zone of the plurality of zones, the method additionally includes, determining, by the control system, an overlap of a respective zone with one or more neighboring boxes to the set of candidate boxes where the neighboring boxes identified by the image from the visual sensor. The method also includes determining, by the control system, a grasp pose for a target candidate box of the set of candidate boxes that avoids one or more walls of the walled container. The method further includes executing, by the control system, the grasp pose to lift the target candidate box by the gripper where the gripper activates each zone of the plurality of zones that does not overlap a respective neighboring box to the target candidate box.

Implementations of the disclosure may include one or more of the following optional features. In some implementations, the method also includes determining, by the control system, that the grasp pose includes minimum coverage of the target candidate box where the minimum coverage corresponds to an area providing suction force sufficient to lift the target candidate box. In some examples, the method additionally includes determining, by the control system, that a part-presence sensor overlaps with the target candidate box by a sufficient margin where the sufficient margin triggers the part-presence sensor to communicate a presence of the target candidate box. Determining the grasp pose for target candidate box may include offsetting the grasp pose based on a location of the one or more walls of the walled container. In some configurations, the method also includes determining, by the control system, that the gripper has lifted the target candidate box a threshold height and activating, by the control system, all zones of the gripper. In some examples, the method further includes identifying, by the control system, a feature of the walled container to avoid during removal of the target candidate box from the walled container and determining, by the control system, a motion path for removal of the target candidate box from the walled container where the motion path avoids the identified feature of the walled container.

Optionally, the plurality of zones may cascade across the plurality of vacuum suction cups of the gripper. The plurality of boxes varying in size may correspond to rectilinear objects. In some example, the plurality of boxes varying in size corresponds to the plurality of boxes varying in height. The grasp pose may correspond to a position of the gripper defined by a set of vacuum suction cups of the plurality of vacuum suction cups overlapping a top surface of a target candidate box.

Another aspect of the disclosure provides a robot that manipulates boxes using a zoned griper. The robot includes a visual sensor, a gripper, and a control system. The gripped includes a plurality of vacuum suction cups and the control system is configured to perform operations. The operations include receiving a minimum box size for a plurality of boxes varying in size, the plurality of boxes located in a walled container. The operations also include dividing a grip area of the gripper into a plurality of zones based on the minimum box size. The operations further include locating a set of candidate boxes of the plurality of boxes based on an image from the visual sensor. For each zone of the plurality of zones, the operations additionally include determining an overlap of a respective zone with one or more neighboring boxes to the set of candidate boxes, the neighboring boxes identified by the image from the visual sensor. The operations also include determining a grasp pose for a target candidate box of the set of candidate boxes that avoids one or more walls of the walled container. The operations further include executing the grasp pose to lift the target candidate box by the gripper to the control system, the grasp pose actuating each zone of the plurality of zones that does not overlap a respective neighboring box to the target candidate box.

This aspect may include one or more of the following optional features. In some implementations, the operations also include determining that the grasp pose includes minimum coverage of the target candidate box where the minimum coverage corresponds to an area providing suction force sufficient to lift the target candidate box. In some examples, the operations additionally include determining that a part-presence sensor overlaps with the target candidate box by a sufficient margin where the sufficient margin triggers the part-presence sensor to communicate a presence of the target candidate box. Determining the grasp pose for target candidate box may include offsetting the grasp pose based on a location of the one or more walls of the walled container. In some configurations, the operations also include determining that the gripper has lifted the target candidate box a threshold height and activating, by the control system, all zones of the gripper. In some examples, the operations further include identifying a feature of the walled container to avoid during removal of the target candidate box from the walled container and determining a motion path for removal of the target candidate box from the walled container where the motion path avoids the identified feature of the walled container.

The details of one or more implementations of the disclosure are set forth in the accompanying drawings and the description below. Other aspects, features, and advantages may be apparent from the description and drawings, and from the claims.

DESCRIPTION OF DRAWINGS

FIGS. 2B-2D are schematic views of example zones for the zoned gripper of FIG. 1.

FIGS. 3A-3J are schematic views of example grasp poses for a target candidate box.

Like reference symbols in the various drawings indicate like elements.

DETAILED DESCRIPTION

Implementations herein are directed toward robotic picking software solutions and zoned grippers that can reliably pick individual boxes of varying sizes, shapes, and/or orientations from an enclosed pallet or container with walls on one or more sides. Although U.S. Patent Publication No. 2017/0246744 describes systems that can pick from mixed-stock keeping unit (SKU) pallets, (e.g., pallets with boxes of different sizes), an additional set of issues arises when trying to pick from mixed-SKU containers (i.e., containers with at least one wall that contain boxes of different sizes). Since portions of the robotic picking process utilize aspects of picking mixed-SKUs, U.S. Patent Publication No. 2017/0246744 is hereby incorporated by reference in its entirety.

Robotic picking of boxes in industrial and/or logistics environments is usually performed using fixed-size single-zone grippers. Here, when the boxes are of different fixed sizes, the position of the vacuum gripper can be adjusted to overlap with only the box to be picked. Generally, the weight and size of boxes being picked and the speed at which they need to be moved determines the size of the vacuum gripper. For example, U.S. Patent Publication No. 2017/0246744 includes examples of such a process for picking mixed-SKU boxes from open pallets.

Picking individual boxes from a container or structure with walls requires a picking robot to avoid collisions with the walls and pick a single box with minimal disturbance to the other contents of the container. In this scenario, when picking boxes of different sizes, the gripper cannot often be placed to overlap a single box without colliding with a wall of the container.

Figure 1:
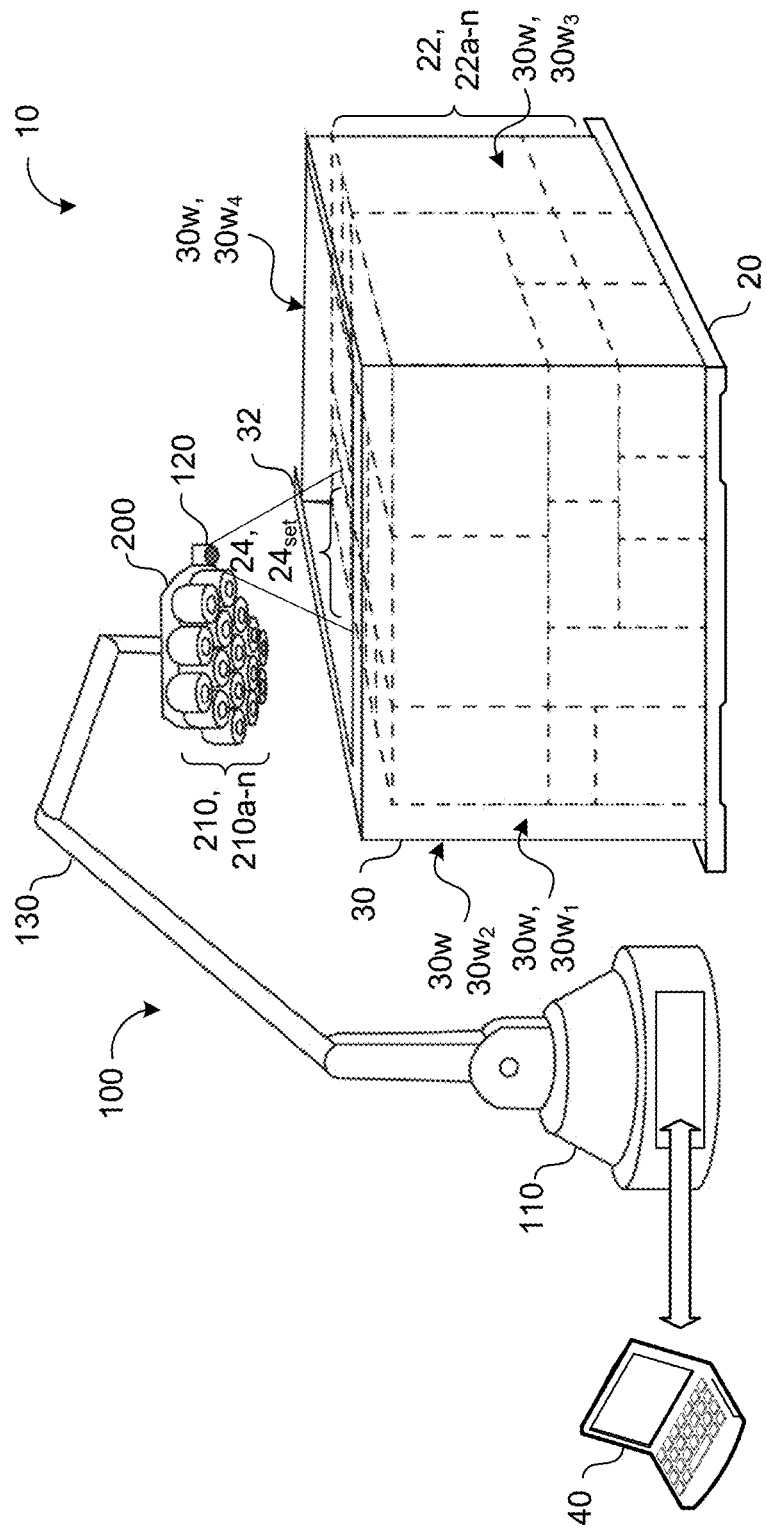
FIG. 1 is a schematic view of an example robot with a zoned gripper in an environment with boxes.

Referring to FIG. 1, an environment 10 includes a pallet 20 supporting a container 30 where the container 30 includes a plurality of mixed-SKU boxes 22, 22a-n. As shown by the dotted hidden lines, the sizes (e.g., dimensions) of the boxes 22 may vary. Here, the container 30 includes four walls $30w_{1-4}$ and a lip 32 around the top of the walls $30w_{1-4}$ opposite the pallet 20. The lip 32 is shown to extend towards a center of the stack of boxes 22. The stack of boxes 22 may have one or more levels (e.g., shown as three levels) where, on a top level, top faces of the boxes 22 face a part of a robot 100 (i.e., the gripper 200 of the robot 100). Although the container 30 is shown with multiple walls $30w$, the container 30 may be any vessel (e.g., bin, bulk bin, skid box, octabin, gaylord box, cage, crate, truck bed, trailer, shipping container, compartment, etc.) with at least one wall that the robot 100 should avoid when picking boxes 22 in the environment 10.

The environment 10 also includes a robot 100 with a control system 110, a visual sensor 120, and an arm 130 with a gripper 200. While the robot 100 is depicted as a stationary robot 100, the robot 100 may include a mobile robot without departing from the scope of the present disclosure. The control system 110 is configured to control the robot 100 by, for example, operation of the gripper 200 to manipulate boxes 22 in the environment. The control system 110 is configured to communicate with a computing device 40. The computing device 40 may be part of the control system 110 or external to the control system 110 (e.g., remote from the control system 110) as shown in FIG. 1. The computing device 40 may enable automated control of the robot 100 via its communication with the control system 110. The computing device 40 may also provide one or more user interfaces for an operator to interact with or to operate/control the robot 100. The computing device 40 may be any of a variety of computing devices 40 and may be connected directly to the control system 110, or may communicate with the control system 110 via intervening devices and networks.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. Suitable alternatives known to those of skill in the art may be employed.

The visual sensor 120 is disposed at a location to observe the boxes 22 to be picked by the robot 100. For instance, as shown in FIG. 1, the visual sensor 120 is mounted on or near the gripper 200 to observe the boxes 22 from above (e.g., with a top-down view relative to the boxes 22). Although the visual sensor 120 is mounted to the gripper 200 in the example shown, the visual sensor 120 could be applied in multiple sensor placement configurations, including cases in which the sensor(s) 120 are mounted on a fixed platform, or in which the sensor(s) 120 are mounted on the gripper 200 or other part of the robot arm 130, or in which the sensor(s) 120 are mounted on a moving platform (mobile robot) on which the robot arm 130 is also mounted. Other variations will be apparent to those of skill in the art.

Figure 2A:
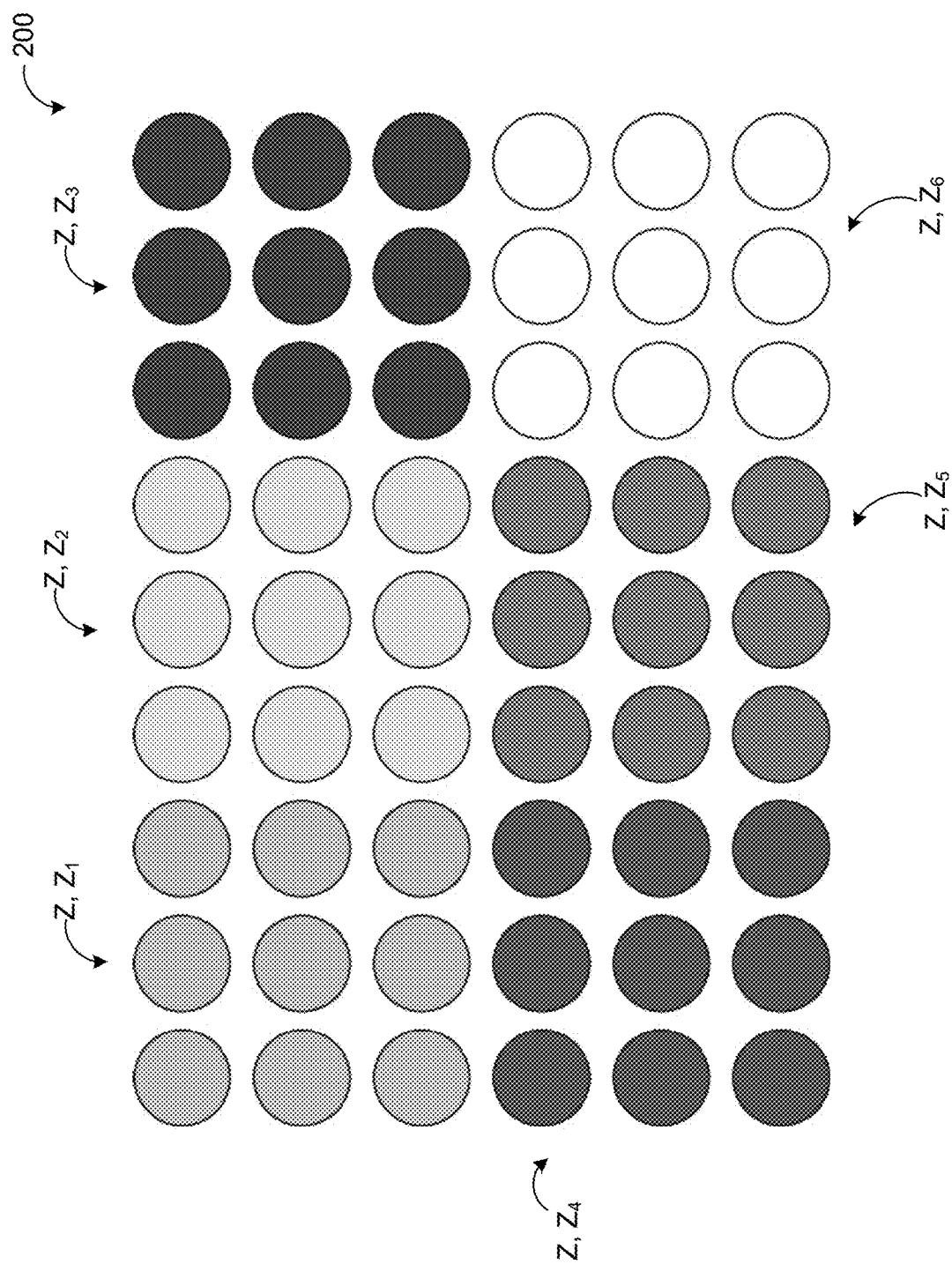
FIG. 2A is a schematic view of an example conventional arrangement for a gripper.
Figure 6:
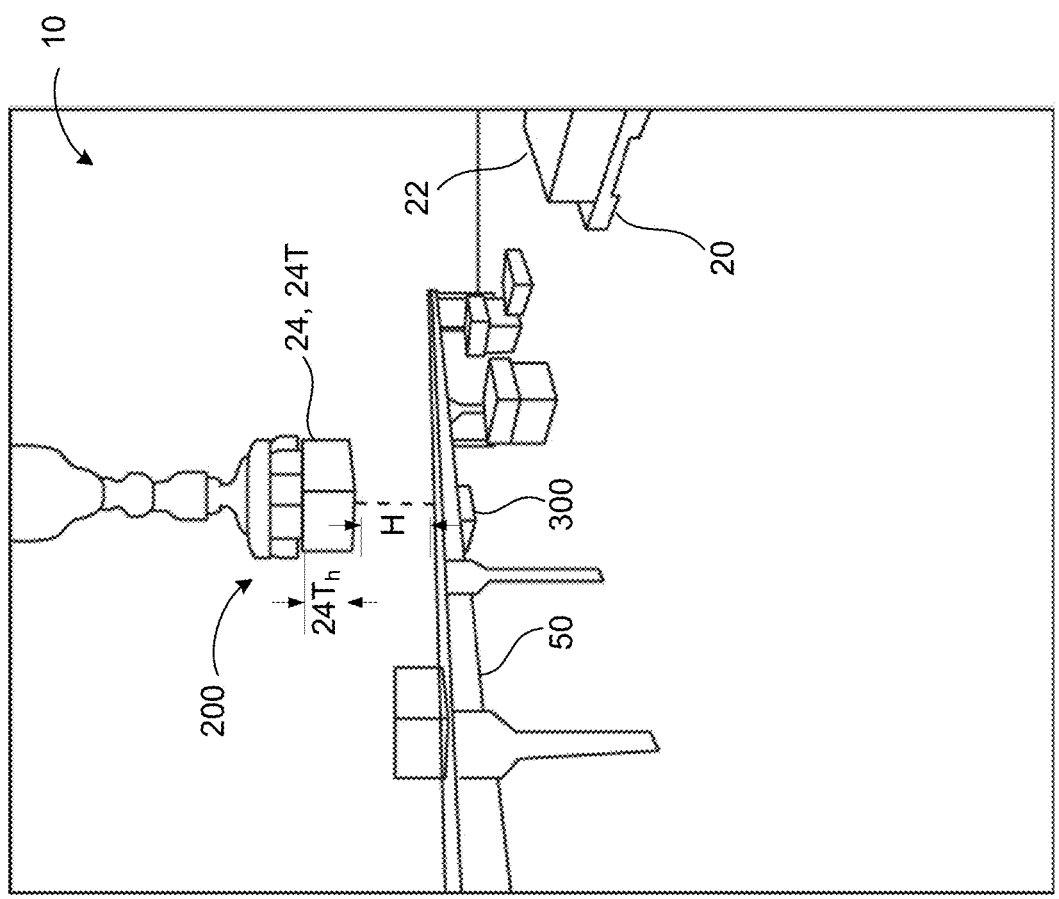
FIG. 6 is a schematic view of an example picking environment with a conveyor.

Referring to FIG. 2A, zoned vacuum grippers may include multiple suction cup zones Z that can be individually controlled to allow a gripper to turn each zone Z on or off when desired independent of the other zones Z. For instance, FIG. 2A illustrates six zones Z, $Z_{1-6}$ (shown in different shades of gray) where each zone Z includes nine suction cups. To pick up boxes 22 from a pallet 20, zoned grippers have been used mostly to pick from single-SKU pallets where the sizes of the boxes are previously known. By knowing the sizes of the boxes beforehand, the zones Z may be explicitly designed to conform to the sizes of the boxes 22 on the pallet 20. When transporting boxes 22 from a single-SKU pallet 20, all zones Z of a zoned gripper 200 may be activated (e.g., turned on) to permit the picking multiple boxes that overlap with the gripper 200. Individual zones Z may then deactivate (e.g., switch off) in sequence to drop individual boxes 22 off on a conveyor 50 (FIG. 6).

Unfortunately, for mixed-SKU pallets 20, there is typically little or no prior information available for the mix of different sizes and/or arrangements of boxes 22 on the mixed-SKU pallets 20. Furthermore, by their very nature, mixed-SKU pallets 20 have mixed layers of boxes 22 and may contain boxes 22 of different heights in the same layer. Positioning a zoned gripper 200 in this scenario may require: (a) choosing/selecting the right/correct box 22 to pick up among multiple boxes in the same layer; (b) correctly selecting the zones Z that need to be switched on for picking the selected box 22; and (c) planning and/or executing a path 500 that permits removal of the selected box 22 from the container 30 while avoiding contact/interference with the walls $30w$ and/or other boxes 22.

For robustness, grippers 200 often include off-the-shelf part-presence sensors 220 (e.g. optical sensors) that are built into the gripper 200 to detect the presence or absence of a box 22 after picking the box 22. This allows for independent confirmation of the success or failure of a grasp by the robot 100. For mixed-SKU box picking, the part-presence sensor 220 needs to be properly positioned relative to the box 22 being picked so that the part-presence sensor 220 will react appropriately to the presence or absence of the box 22.

Implementations herein are directed toward using a robot 100 to pick individual boxes 22 from a mixed-SKU collection of boxes 22 in a container 30, cage, or any kind of structure with at least one wall $30w$, feature, or other component that may potentially obstruct the motion of the robot 100 while picking the boxes 22.

In some implementations, the only prior information available to the system (e.g., the control system 110) is the minimum and maximum sizes of the boxes 22 to be picked. The zoned gripper 200 may be configured as a cascaded set of zones Z (e.g., based on the minimum and maximum sizes). For instance, FIGS. 2B-2D depict the zoned gripper 200 including three zones Z, $Z_{1-3}$ to form a cascaded set of zones Z. More particularly, FIG. 2B illustrates the first zone Z, $Z_1$ of the cascaded set of zones Z including three rows and three columns of suction cups 210 switched on in the top left corner of the gripper 200 relative to the view of FIG. 2B. FIG. 2C shows that a second zone Z, $Z_2$ for the gripper 200 includes different dimensions than the first zone $Z_1$ by including an L-shaped configuration that includes switching on the next row and column of suction cups 210 of the gripper 200. FIG. 2D is similar to FIG. 2C such that a third zone Z, $Z_3$ does not include switching on any suction cups 210 from the prior zones Z and includes a larger L-shaped configuration than the second zone $Z_2$ by switching on the next row and column of suction cups 210 of the gripper 200.

In some examples, the overall size of the gripper 200 is determined by the size of the largest box 22 to be picked. For example, the gripper 200 in FIGS. 2B-2D includes a five by five (5×5) arrangement of suction cups because the largest box 22 has a size that is less than or equal to the five by five arrangement of suction cups 210. The smallest zone Z for which the gripper 200 may be configured may be based on the size of the smallest box 22 to be picked.

In additional implementations, the control system 110 uses data obtained from the visual sensor 120 mounted above the container 30 (e.g., overhead and/or on the robot 100 itself) to locate a set of candidate boxes 24, $24_{set}$ (e.g., shown in FIG. 1) on the top of the stack of boxes 22. The boxes 22 may vary in size, have different visual appearances (e.g., colors, textures, designs, etc.), and could have different heights in each layer as well. In addition, the boxes 22 and/or their respective surfaces may be at varied orientations in three-dimensional space (e.g., not necessarily limited to rectilinear objects placed flat inside the container).

Figure 3B:
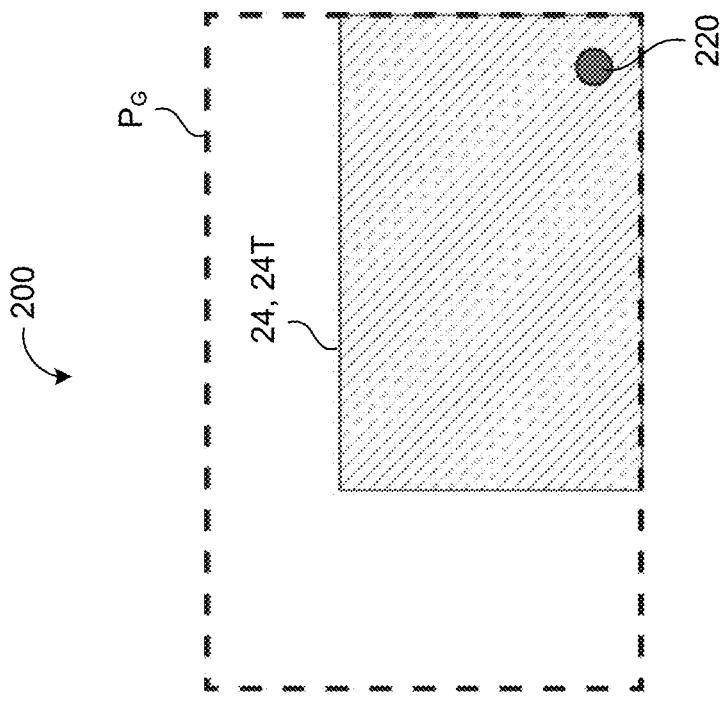
Figure 3A:
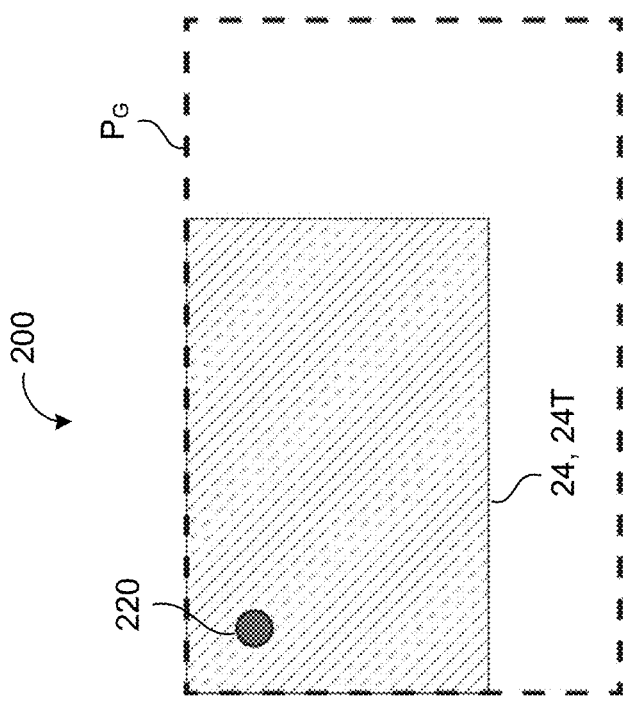
Figure 3D:
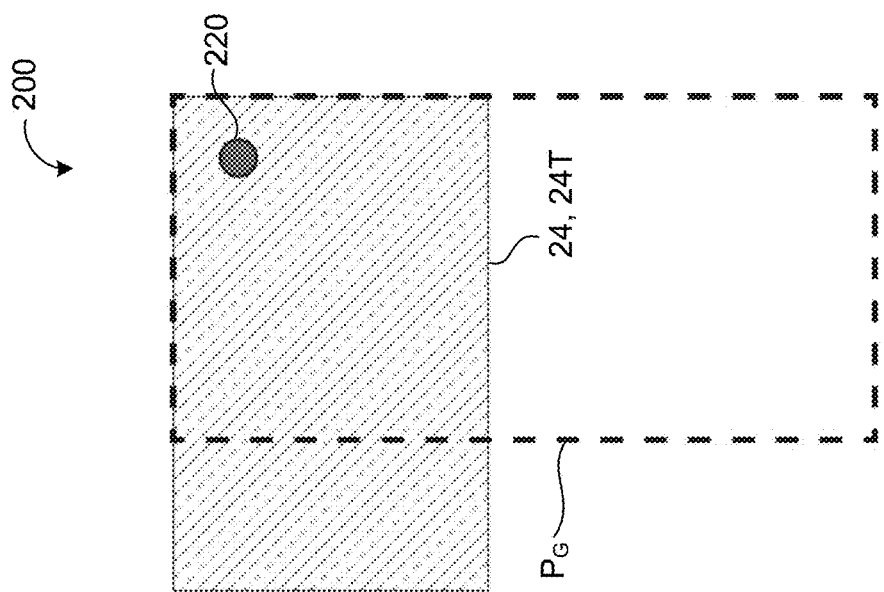
Figure 3C:
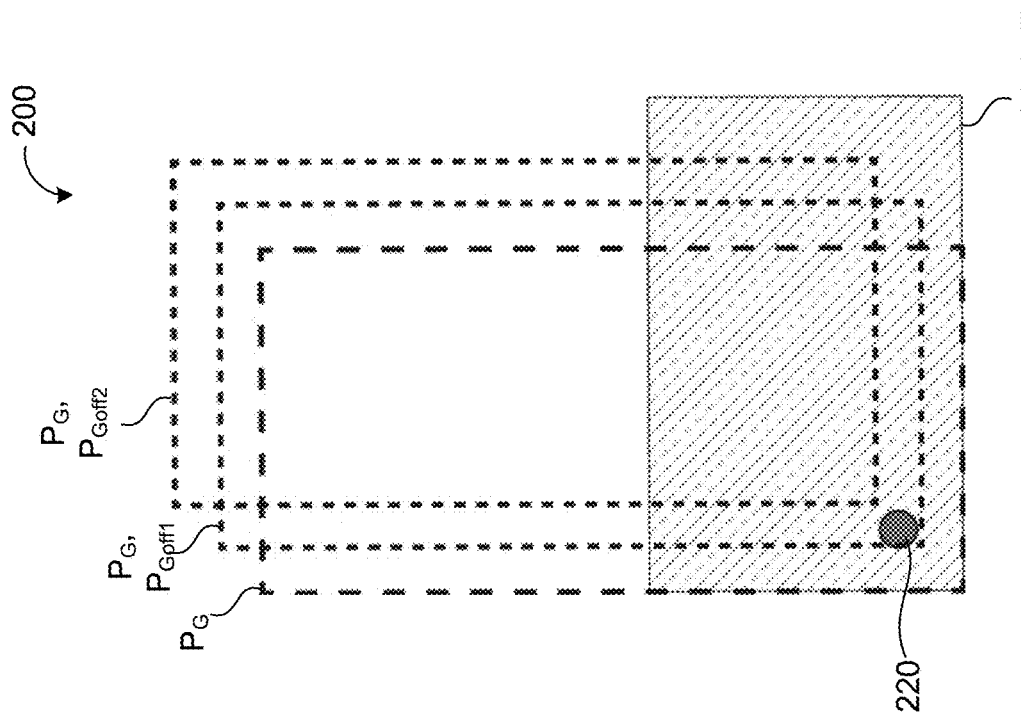

Referring to FIGS. 3A-3J, the control system 110 and/or computing device 40 may compute a set of grasp poses $P_G$ for each candidate box 24. A grasp pose $P_G$ is a position of the gripper 200 where a subset or all of the suction cups 210 on the gripper 200 overlap (partly or fully) the top surface of the object being picked. Multiple grasp poses $P_G$ may be computed for each box 24 starting, for example, with full overlap with one corner of the gripper 200 placed over each of the corners of the box 24 to be picked, but also including partial overlap where only parts of the box 24 being picked are covered by the suction cups 210. For example, FIGS. 3A and 3B illustrate a single grasp pose $P_G$ for a target candidate box 24, 24T where the grasp pose $P_G$ fully overlaps a smaller target candidate box 24, 24T. Here, in FIG. 3A, the grasp pose $P_G$ aligns with a top and left edge of the target candidate box 24, 24T while in FIG. 3B, the grasp pose $P_G$ aligns with the bottom and right edge of the target candidate box 24, 24T. The part-presence sensor 220 is shown throughout FIGS. 3A-3J as a circular mark (e.g., similar to a fiducial registration target). In some implementations, such as in FIG. 3C, the control system 110 and/or computing device 40, generate an offset grasp pose $P_{Goff}$ (e.g., based off a grasp pose $P_G$) as an alternative grasp pose $P_G$ to lift the target candidate box 24, 24T. For instance, FIG. 3C depicts two offset grasp poses $P_{Goff,1-2}$. In FIGS. 3C and 3D, neither grasp pose $P_G$ fully overlaps the target candidate box 24, 24T; therefore, these grasp poses $P_G$ are partially overlapping grasp poses $P_G$.

Figure 3E:
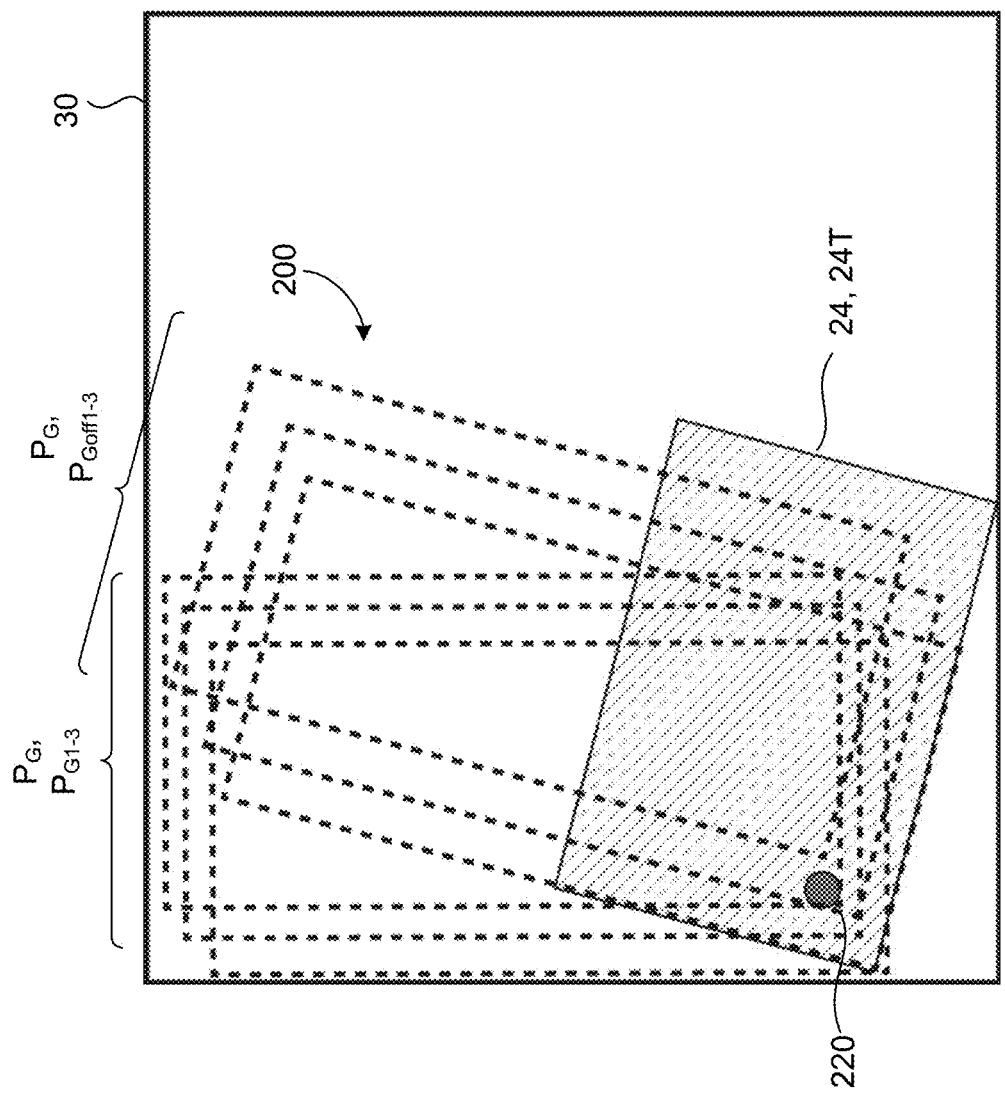

In some examples, when the target candidate box 24, 24T is smaller than the gripper 200 and inside the container 30 as shown in FIG. 3E, the control system 110 and/or computing device 40 is configured to generate a plurality of grasp poses $P_G$ (e.g., including offset grasp poses $P_{Goff}$). For instance, generating the plurality of grasp poses $P_G$ may include generating an offset grasp pose $P_{Goff}$ for each candidate grasp pose $P_G$ (e.g., FIG. 3E shows three grasp poses $P_{Goff1-3}$ with three candidate grasp pose $P_{G1-3}$). By having a plurality of grasp poses $P_G$ and/or offset grasp poses $P_{Goff}$, the gripper 200 may have options to avoid a collision or disturbance with the container 30 during picking the target candidate box 24T.

Figure 3F:
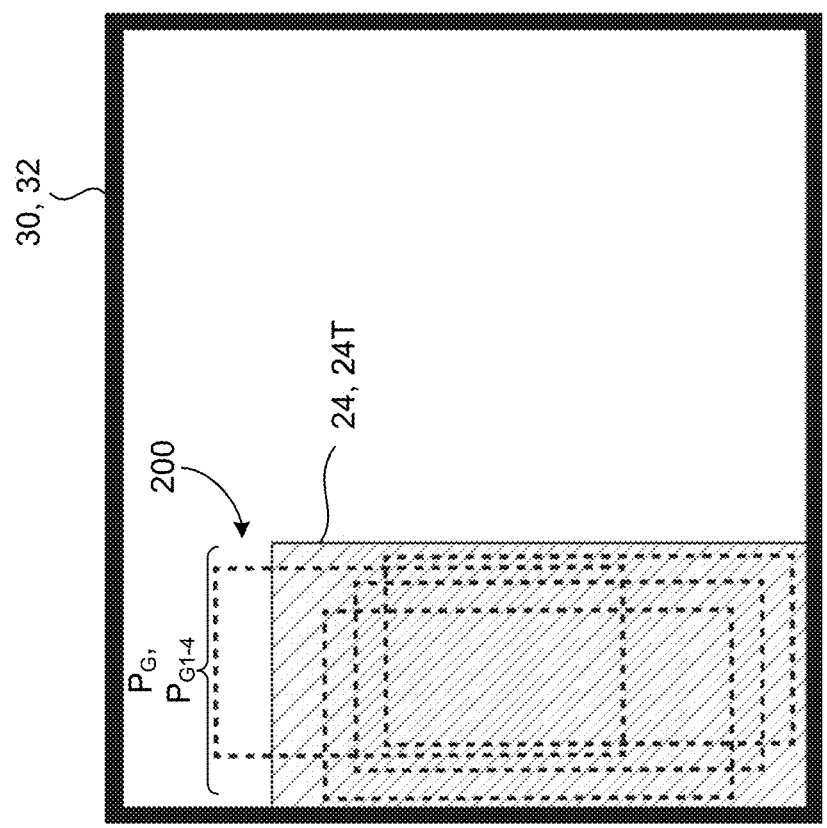

The computation of a viable grasp pose $P_G$ also accounts for the presence of the walls 30w of the container 30. When the gripper 200 is in a viable grasp pose $P_G$, it is preferable that it not collide with the walls 30w (or other boxes 22). Grasp poses $P_G$ may also be offset in orientation from the orientation of the box 22 and the orientation of the container 30 (e.g., as shown in FIG. 3E). In contrast to FIG. 3E, FIG. 3F shows an example where the gripper 200 is smaller than the target candidate box 24T (i.e., the target candidate box 24, 24T is larger than the gripper 200). Here, the control system 110 and/or computing device 40 is also configured to generate a plurality or set of grasp poses $P_G$ (e.g., shown as four candidate grasp poses $P_{G1-4}$) that are sufficient to lift the target candidate box 24, 24T. FIG. 3F also depicts the lip 32 of the container 30 to illustrate a potential obstacle for the gripper 200 when maneuvering boxes 22 inside the container 30.

Similarly, FIGS. 3G-3J illustrates examples where the gripper 200 is smaller than the target candidate box 24T. These examples depict that the location of the part-presence sensor 220 may change depending on, for example, the grasp pose $P_G$ or the size of the target candidate box 24, 24T. Even with changing the location of the part-presence sensor 220 for each grasp pose $P_G$, the computing device 40 and/or control system 110 is configured to check whether the part-presence sensor 220 overlaps with the box 24T by a sufficient margin. Here, overlap with the box 24T by the sufficient margin allows triggering the part-presence sensor 220 when the box is close to the sensor 220.

Referring back to FIGS. 3A-3J, regardless of the resultant number of candidate grasp poses $P_G$, every grasp pose $P_G$ may be restricted to have a minimum coverage of the box 24, 24T being picked to ensure that there is sufficient suction force to pick the box 22. Additionally or alternatively, for each grasp pose $P_G$, the control system 110 and/or computing device 40 may compute the overlap of various gripper zones Z with the box 24, 24T to be picked. In some implementations, systems for the robot 100 (the control system 110 and/or computing device 40) compute the overlap of each gripper zone Z with neighboring boxes 26 that are not candidates for picking. For instance, for each grasp pose $P_G$, the systems use a list of boxes 22 provided by the vision component 120 to compute the overlap of each gripper zone Z with neighboring boxes 26 that are not candidates for picking.

Figure 4C:
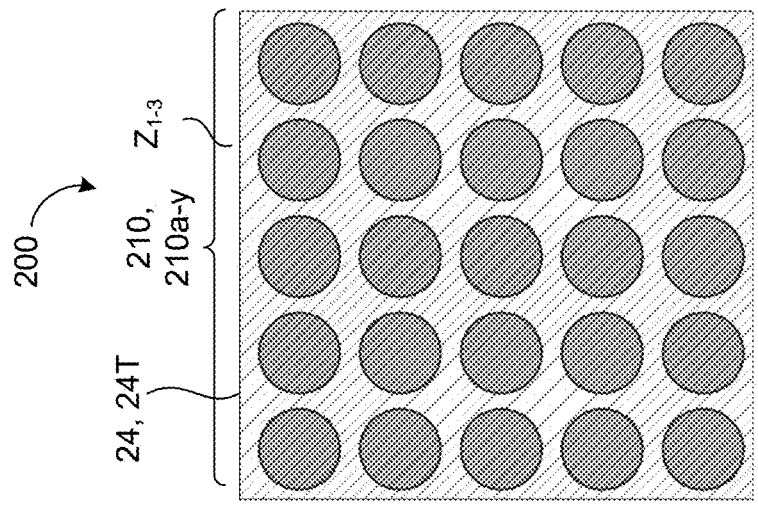
FIGS. 4A-4D are schematic views of example zone gripper actuations with respect to a target candidate box.
Figure 4B:
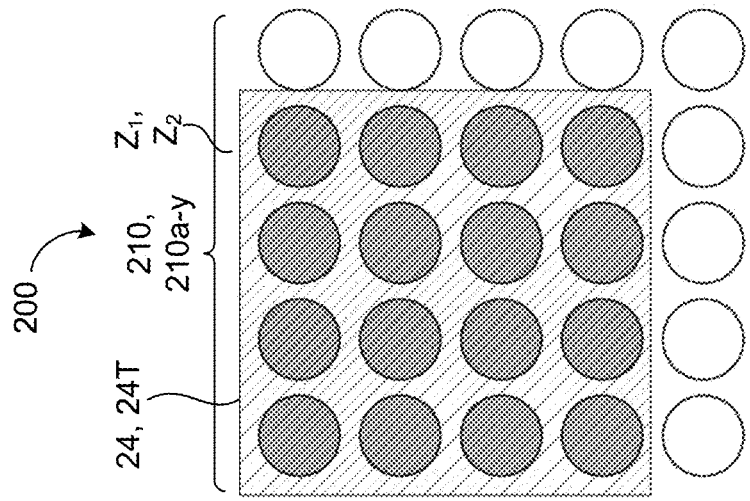
Figure 4A:
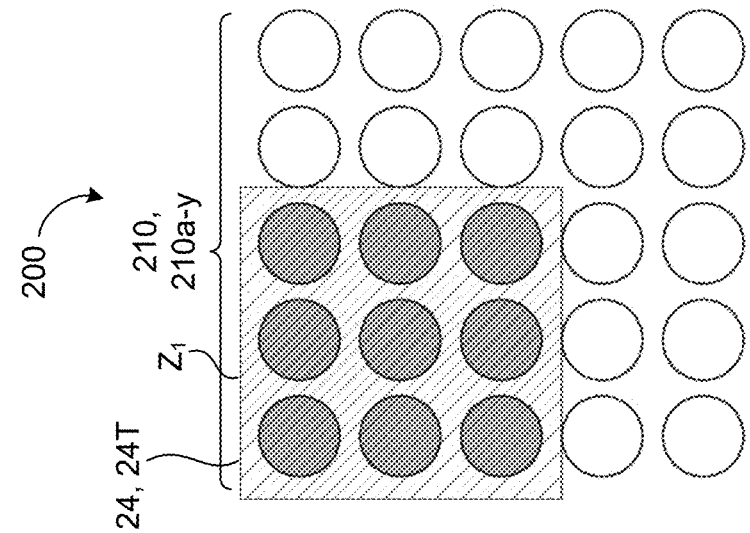

When there is no overlap between the gripper zones Z and neighboring boxes 26 that are not candidates for picking, all zones Z in the vacuum gripper 200 may activate (e.g., switch on) during the picking process for a particular candidate box 24, 24T. For instance, FIGS. 4A-4C depict a single target candidate box 24, 24T that activates the cascading set of zones Z, $Z_{1-3}$ of FIGS. 2B-2D. For example, the target candidate box 24, 24T in FIG. 4A includes a size requiring activation of only a first zone $Z_1$. In FIG. 4B, the target candidate box 24, 24T includes a larger size requiring activation of both the first zone $Z_1$ and the second zone $Z_2$ to lift the target candidate box 24, 24T. In FIG. 4C, the target candidate box 24, 24T is larger than the sizes of FIGS. 4A and 4B, thereby requiring activation of all zones $Z_{1-3}$ to lift the target candidate box 24, 24T. This tracking of overlap with neighboring boxes 26 that are not candidates for picking advantageously provides the gripper with maximum picking coverage for each individual box 24 in a mixed-SKU collection.

Figure 4D:
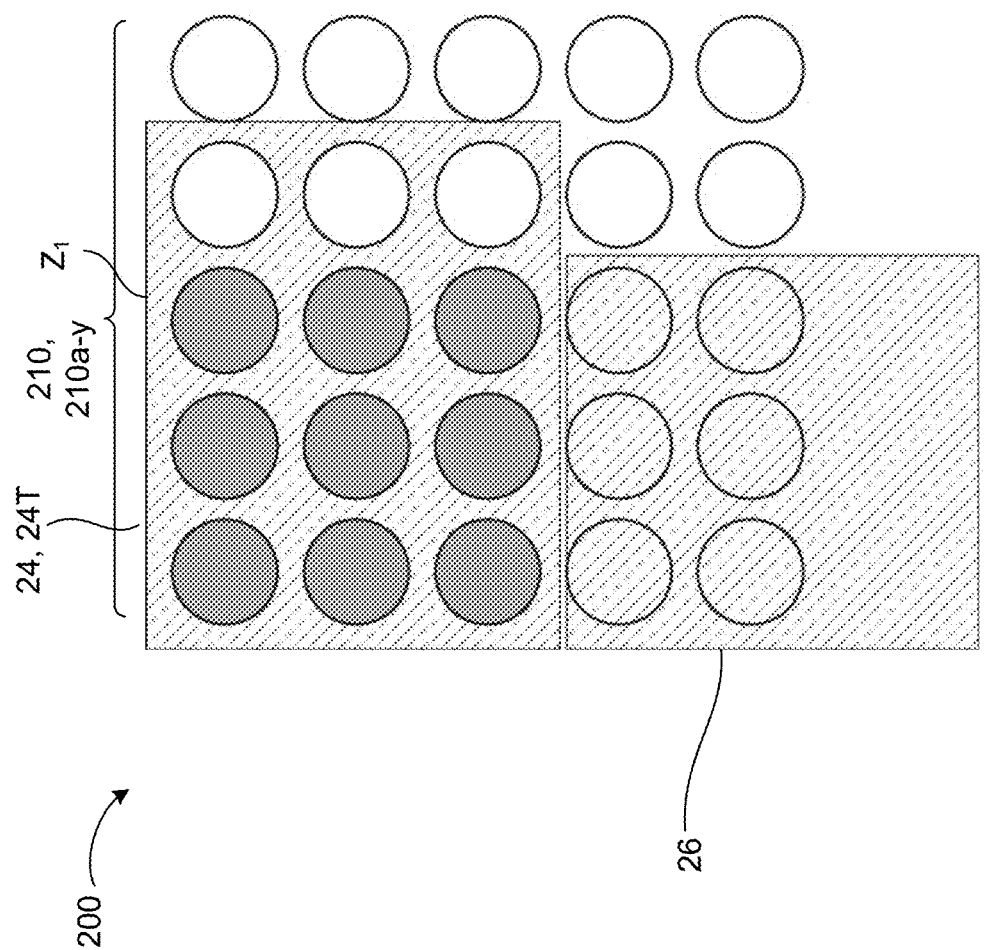

When there is overlap between the zones Z and neighboring boxes 26 that are not candidates for picking, any zone Z that overlaps a neighboring box 26 is not initially activated when picking an individual box 22. The smallest zone Z overlapping the target candidate box 24T is always activated (e.g., switched on) upon initially grasping the target candidate box 24T. Once the individual target candidate box 24T has been picked up and moved by a small distance (e.g., some threshold distance), additional (up to all) zones Z may be switched on, thereby ensuring maximum coverage for grasping the box 24T. Referring to FIG. 4D, in some implementations, when a neighboring box 26 overlaps one or more zones Z of the gripper 200 (e.g., the second zone $Z_2$ and the third zone $Z_3$) needed for providing maximum picking coverage based on a size of a target candidate box 24T, the control system 110 and/or computing device 40 initially only activates the first zone $Z_1$ to grasp the target candidate box 24T while leaving the first and second zones $Z_2$, $Z_3$ deactivated. Here, once the gripper 200 has lifted the target candidate box 24T to a particular height with only the first zone $Z_1$ activated, the control system 110 and/or computing device 40 may then activate all zones Z (e.g., maintain activation of the first zone $Z_1$ and switch on the second and third zones $Z_2$, $Z_3$. The particular height may include a threshold height that prevents grasping of the one or more neighboring boxes 26 upon activation of the overlapping zones Z.

Figure 5B:
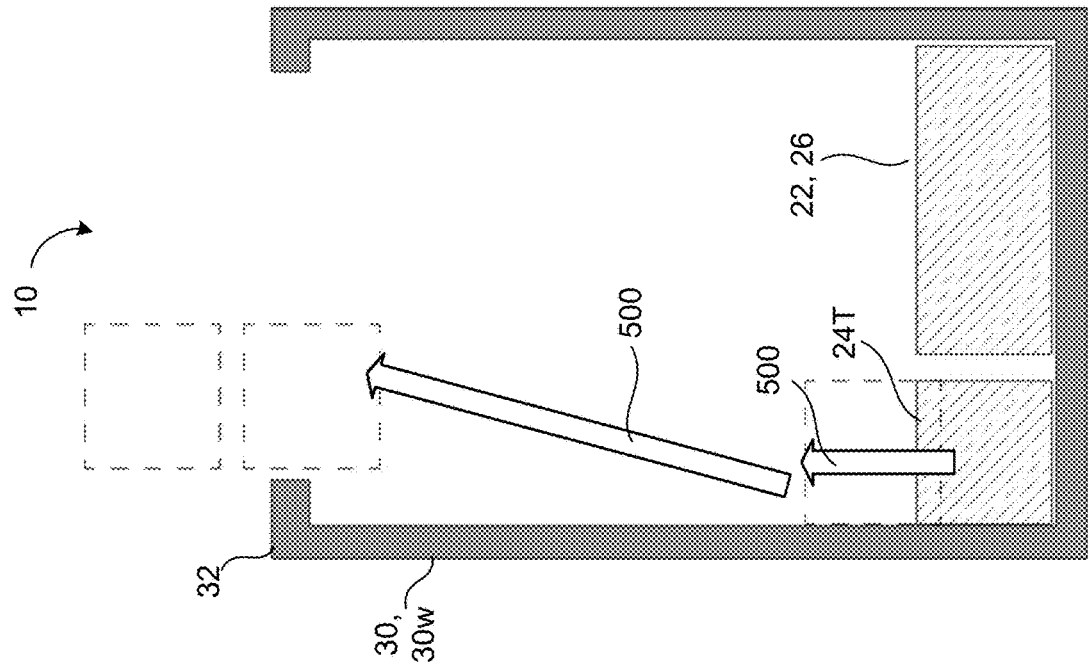
FIGS. 5A and 5B are cross-sectional views of a container with example movement paths to remove a box from within the container.
Figure 5A:
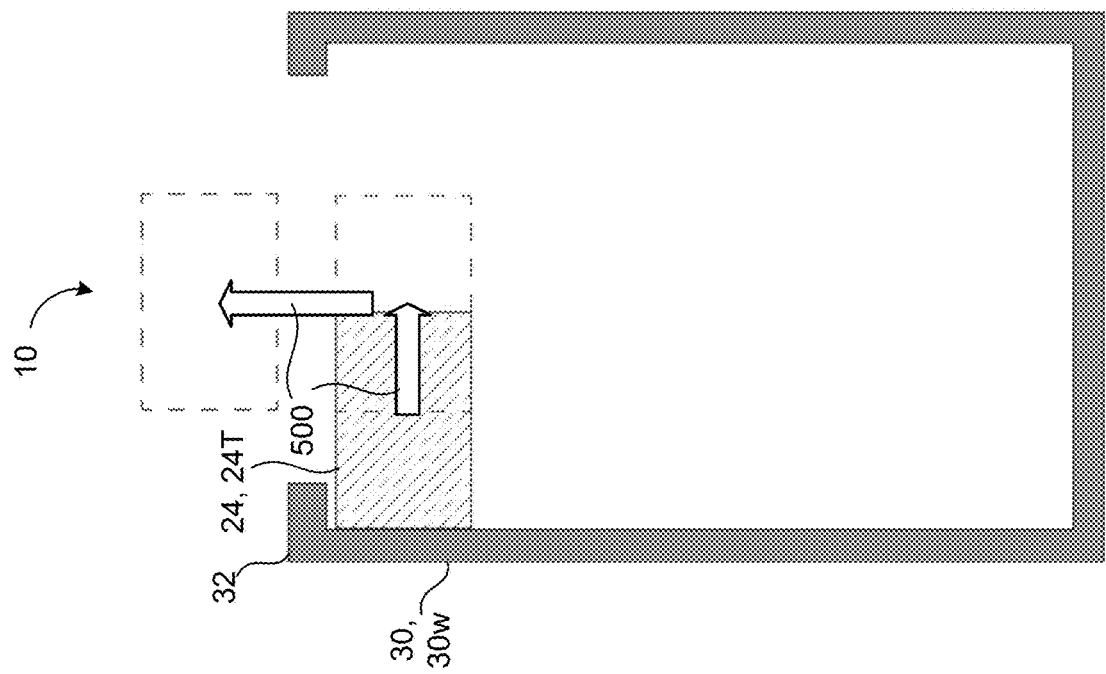

When a grasping planning phase is complete (i.e., with each grasp pose $P_G$ computed and a selection of zones Z to be activated for a particular box 24T determined), the system (e.g., the control system 110 or the computing device 40) then proceeds to a path planning stage. FIGS. 5A and 5B show an example robot environment 10 depicting a cross-sectional view of a container 30 holding boxes 24, 26 of varying size. In the path planning stage, the system computes a path 500 to remove the object (i.e., a box 22) from the container 30 for transport to a target location. For instance, the robot 100 may remove a target candidate box 24T from a pallet 30 and place the target candidate box 24T onto a conveyor 50 (FIG. 6). In some examples, when computing the path 500, the system accounts for the size of the target candidate box 24T being picked (according to some implementations postulating its height to be a fixed maximum height).

The first part of the computed path 500 is a straight line or set of straight line motions of the box 24T where it is moved away from the other boxes 22 in the container 30 and/or from the container walls 30w. This motion is computed by taking into account the nature of the container 30, e.g., some containers have a "lip" 32 or protrusion of the walls 30w. To reduce the likelihood of collision with features of the container 30 while moving the target candidate box 24T, the system computes the motion of the target candidate box 24T to avoid a collision with the features of the container 30. For example, in the case of a lip 32 (e.g., as shown in FIGS. 5A and 5B), the computed motion of a picked box 24T might be a move inward towards a center of the container 30 by at least a distance greater than (or equal to) a width of the lip 32 while also moving up towards the top of the container 30. The amount of upward motion may be adjusted based on the position of the box 24T in the container 30 as shown comparatively between FIGS. 5A and 5B. For instance, FIG. 5A shows that boxes 24T closer to the lip 32 are moved mostly sideways to clear the lip 32 (e.g., as shown in FIG. 5A). On the other hand, FIG. 5B shows that boxes 22, 24T positioned closer to the bottom of the container 30 are moved upward and inward towards the top-center of the container 30 (e.g., as shown in FIG. 5B). Here, the robot 100 accounts for the height needed to travel with the box 24T to remove the box 24T from the container 30 when avoiding a feature of the container 30, such as a lip 32. In this example, the robot 100 may move the box 24T along two axis simultaneously and potentially minimize sudden movements when avoiding features of the container 30. In some implementations, the movement path 500 for moving each box 24T includes first moving (e.g., straight up) the box 24T to clear other boxes 22 (e.g., neighboring boxes 26) before moving inward to the top-center of the container 30 to clear the lip 32 and/or walls 30w. Additionally or alternatively, once the robot 100 moves boxes 24T out of the container 30, the robot 100 can move the boxes 24T to the target location (e.g., a conveyor 50).

Referring to FIG. 6, a conveyor sensor 300 (e.g., a distance/position sensor such as a laser distance sensor) is mounted underneath the conveyor 50 and configured to measure a height H of a bottom surface of a box 24T relative to the conveyor sensor 300 as a gripper 200 moves the box 24T to the conveyor 50. Here, the height H refers to a distance between the bottom surface of the box 24T and the support surface of the conveyor 50 (e.g., conveyor belt). This data conveying the height H is synchronized with information about the position of the robot 100 at that moment. For instance, the control system 110 is aware of a position and/or a location of a top surface of the box 24T. More specifically, the robot 100 identifies a location on the box 24T to lift the box 24T accordingly to the grasp pose $P_G$ (e.g., by using the visual sensor 120). In some configurations, with the height H from the conveyor sensor 300, the location of the gripper 200 to engage the top surface of the box 24T, and the control coordinates for movement of the box 24T (e.g., along the path 500 and/or to the conveyor 50), the robot 100 (e.g., at the control system 110 or the computing device 40) determines the height h of the box $24T_h$. In other words, the system approximately infers the height $24T_h$ of the box 24T based on its relationship to the conveyor sensor 300 and other control data (e.g., kinematics and/or dynamics) about the robot 100. The robot 100 may use the height H and/or the box height $24T_h$ to minimize a drop height above the conveyor 50 where the robot 100 deactivates one or more zones Z of the gripper 200 to release the box 24T; therefore, generating a soft landing for the box 24T. By minimizing the drop height, the robot 100 may prevent damage to the box 24T and/or items contained within the box 24T. Here, the drop height may be the equivalent of the height H, which may or may not include an offset distance accounting for the mounting position of the conveyor sensor 300 with respect to a surface of the conveyor 50. In some examples, the control system 110 and/or computing device 40 modifies the path 500 for placing the box 24T on the conveyor 50 so that each box 22 is released approximately the same distance from the conveyor 50. Although FIG. 6 illustrates the soft landing technique with respect to a conveyor 50, this concept may be translated to any placement surface where the robot 100 intends to release the box 24T from its grasp. In some implementations, the conveyor sensor 300 include ultrasonic sensors, 3D camera, stereo vision or any other distance measuring device.

Figure 7:
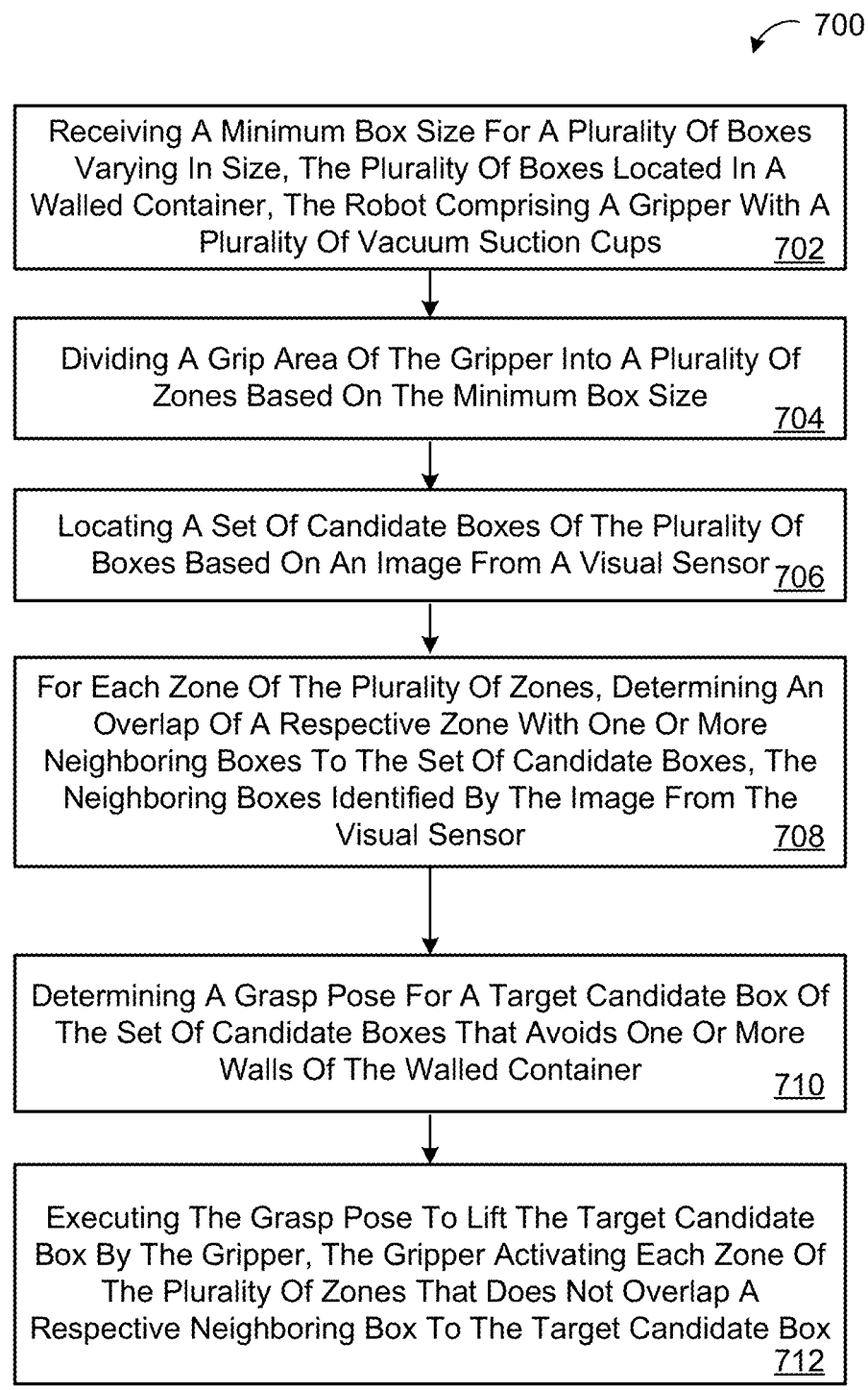
FIG. 7 is a flow diagram of an example arrangement of operations for a method of using a zoned gripper to grasp and move a target candidate box.

FIG. 7 is a flowchart of an example arrangement of operations for a method 700 of using a zoned gripper 200 to grasp and move a target candidate box 24T. At operation 702, the method 700 receives, at system (e.g., the control system 110 or the computing device 40) of a robot 100, a minimum box size for a plurality of boxes 22 varying in size where the plurality of boxes 22 are located in a walled container 30. Here, the robot 100 includes a gripper 200 with a plurality of vacuum suction cups 210. At operation 704, the method 700 divides a grip area of the gripper 200 into a plurality of zones Z based on the minimum box size. At operation 706, the method 700 locates a set of candidate boxes 24 of the plurality of boxes 22 based on an image from a visual sensor 120. For each zone Z of the plurality of zones Z, at operation 708, the method 700 determines an overlap with a respective zone Z with one or more neighboring boxes 26 to the set of candidate boxes 24. Here, the neighboring boxes 26 are identified by the image from the visual sensor 120. At operation 710, the method 700 determines a grasp pose $P_G$ for a target candidate box 24T of the set of candidate boxes 24 that avoids one or more walls 30w of the walled container 30. At operation 712, the method 700 executes the grasp pose $P_G$ to lift the target candidate box 24T by the gripper 200. Here, the gripper 200 activates each zone Z of the plurality of zones Z that does not overlap a respective neighboring box 26 to the target candidate box 24T.

It should be noted that implementations are contemplated in which the robot 100 may be in any of a variety of orientations relative to the container and may even, in some instances, be mobile. Different robot 100 types may also be employed (e.g., serial arm robots, parallel or "delta" robots, etc.).

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects.

A number of implementations have been described. Nevertheless, it will be understood that various modifications may be made without departing from the spirit and scope of the disclosure. Accordingly, other implementations are within the scope of the following claims.

What is claimed is:
1. A method comprising:
receiving, at a control system, a minimum box size for a plurality of boxes varying in size, the plurality of boxes located in a walled container, the robot comprising a gripper with a plurality of vacuum suction cups;
dividing, by the control system, a grip area of the gripper into a plurality of zones based on the minimum box size;
locating, by the control system, a set of candidate boxes of the plurality of boxes based on an image from a visual sensor;
for each zone of the plurality of zones, determining, by the control system, an overlap of a respective zone with one or more neighboring boxes to the set of candidate boxes, the neighboring boxes identified by the image from the visual sensor;
determining, by the control system, a grasp pose for a target candidate box of the set of candidate boxes that avoids one or more walls of the walled container; and
executing, by the control system, the grasp pose to lift the target candidate box by the gripper, the gripper activating each zone of the plurality of zones that does not overlap a respective neighboring box to the target candidate box.

2. The method of claim 1, further comprising, determining, by the control system, that the grasp pose includes minimum coverage of the target candidate box, the minimum coverage corresponding to an area providing suction force sufficient to lift the target candidate box.

3. The method of claim 1, further comprising determining, by the control system, that a part-presence sensor overlaps with the target candidate box by a sufficient margin, the sufficient margin triggering the part-presence sensor to communicate a presence of the target candidate box.

4. The method of claim 1, wherein determining the grasp pose for the target candidate box comprises offsetting the grasp pose based on a location of the one or more walls of the walled container.

5. The method of claim 1, further comprising:
determining, by the control system, that the gripper has lifted the target candidate box a threshold height; and
activating, by the control system, all zones of the gripper.

6. The method of claim 1, further comprising:
identifying, by the control system, a feature of the walled container to avoid during removal of the target candidate box from the walled container; and
determining, by the control system, a motion path for removal of the target candidate box from the walled container, the motion path avoiding the identified feature of the walled container.

7. The method of claim 1, wherein the plurality of zones cascade across the plurality of vacuum suction cups of the gripper.

8. The method of claim 1, wherein the plurality of boxes varying in size correspond to rectilinear objects.

9. The method of claim 1, wherein the plurality of boxes varying in size corresponds to the plurality of boxes varying in height.

10. The method of claim 1, wherein the grasp pose corresponds to a position of the gripper defined by a set of vacuum suction cups of the plurality of vacuum suction cups overlapping a top surface of a target candidate box.

11. A robot comprising:
a visual sensor;
a gripper comprising a plurality of vacuum suction cups; and
a control system configured to perform operations comprising:
receiving a minimum box size for a plurality of boxes varying in size, the plurality of boxes located in a walled container;
dividing a grip area of the gripper into a plurality of zones based on the minimum box size;
locating a set of candidate boxes of the plurality of boxes based on an image from the visual sensor;
for each zone of the plurality of zones, determining an overlap of a respective zone with one or more neighboring boxes to the set of candidate boxes, the neighboring boxes identified by the image from the visual sensor;
determining a grasp pose for a target candidate box of the set of candidate boxes that avoids one or more walls of the walled container; and
executing the grasp pose to lift the target candidate box by the gripper to the control system, the grasp pose actuating each zone of the plurality of zones that does not overlap a respective neighboring box to the target candidate box.

12. The robot of claim 11, wherein the operations further comprise determining that the grasp pose includes minimum coverage of the target candidate box, the minimum coverage corresponding to an area providing suction force sufficient to lift the target candidate box.

13. The robot of claim 11, wherein the operations further comprise determining that a part-presence sensor overlaps with the target candidate box by a sufficient margin, the sufficient margin triggering the part-presence sensor to communicate a presence of the target candidate box.

14. The robot of claim 11, wherein determining the grasp pose for the target candidate box comprises offsetting the grasp pose based on a location of the one or more walls of the walled container.

15. The robot of claim 11, wherein the control system is further configured to:
lift the target candidate box by a threshold height; and
activate all zones of the gripper.

16. The robot of claim 11, wherein the operation further comprise:
identifying a feature of the walled container to avoid during removal of the target candidate box from the walled container; and
determining a motion path for removal of the target candidate box from the walled container, the motion path avoiding the identified feature of the walled container.

17. The robot of claim 11, wherein the plurality of zones cascade across the plurality of vacuum suction cups of the gripper.

18. The robot of claim 11, wherein the plurality of boxes varying in size correspond to rectilinear objects.

19. The robot of claim 11, wherein the plurality of boxes varying in size corresponds to the plurality of boxes varying in height.

20. The robot of claim 11, wherein the grasp pose corresponds to a position of the gripper defined by a set of vacuum suction cups of the plurality of vacuum suction cups overlapping a top surface of a target candidate box.

* * * * *